United States Patent
Kim et al.

(10) Patent No.: US 9,681,424 B2
(45) Date of Patent: Jun. 13, 2017

(54) METHOD FOR OPERATING A STATION IN A WHITE SPACE, AND APPARATUS FOR SAME

(75) Inventors: Eunsun Kim, Gyeonggi-do (KR); Yongho Seok, Gyeonggi-do (KR)

(73) Assignee: LG Electronics Inc., Seoul (KR)

(*) Notice: Subject to any disclaimer, the term of this patent is extended or adjusted under 35 U.S.C. 154(b) by 73 days.

(21) Appl. No.: 13/643,796

(22) PCT Filed: Apr. 27, 2011

(86) PCT No.: PCT/KR2011/003086
§ 371 (c)(1),
(2), (4) Date: Jan. 7, 2013

(87) PCT Pub. No.: WO2011/136560
PCT Pub. Date: Nov. 3, 2011

(65) Prior Publication Data
US 2013/0109403 A1 May 2, 2013

Related U.S. Application Data
(60) Provisional application No. 61/328,190, filed on Apr. 27, 2010, provisional application No. 61/352,401, (Continued)

(51) Int. Cl.
*H04W 72/00* (2009.01)
*H04W 74/00* (2009.01)
(Continued)

(52) U.S. Cl.
CPC ........... *H04W 72/04* (2013.01); *H04W 16/14* (2013.01); *H04W 72/082* (2013.01)

(58) Field of Classification Search
CPC . H04W 16/00; H04W 28/00–28/0278; H04W 28/08–28/26
See application file for complete search history.

(56) References Cited

U.S. PATENT DOCUMENTS
2007/0238419 A1 10/2007 Dubois et al.
2008/0112467 A1* 5/2008 Shellhammer ................ 375/143
(Continued)

FOREIGN PATENT DOCUMENTS
KR 10-2006-0055072 A 5/2006
KR 10-2009-0109052 A 10/2009

OTHER PUBLICATIONS
International Search Report issued in corresponding International Application No. PCT/KR2011/003086 dated Nov. 30, 2011.

*Primary Examiner* — San Htun
(74) *Attorney, Agent, or Firm* — Morgan, Lewis & Bockius LLP

(57) ABSTRACT

The present invention relates to a method and apparatus, in which a station (STA) which operates in an available channel that is not used by a licensed device, detects a signal (hereinafter, referred to as 'primary signal') of the licensed device in a white space band, and operates in the available channel. According to the present description, the station receives white space map (WSM) information which contains available channel identification information from a device having database information; acquires the result of measurement for detecting the presence of the primary signal in a specific band range; and transmits, to another station, the WSM which is updated to contain information on the band in which the primary signal is detected, wherein the updated WSM further contains information which indicates whether each available channel in the updated WSM is based on the database information or based on the result of measurement.

14 Claims, 9 Drawing Sheets

Related U.S. Application Data filed on Jun. 8, 2010, provisional application No. 61/355,561, filed on Jun. 17, 2010.

(51) Int. Cl.
*H04W 72/04* (2009.01)
*H04W 16/14* (2009.01)
*H04W 72/08* (2009.01)

(56) References Cited

U.S. PATENT DOCUMENTS

| | | | |
|---|---|---|---|
| 2009/0154485 A1* | 6/2009 | Park | H04W 72/02 370/438 |
| 2010/0048234 A1* | 2/2010 | Singh | 455/509 |
| 2010/0085921 A1 | 4/2010 | Wu et al. | |
| 2010/0175101 A1* | 7/2010 | Devictor | H04N 21/236 725/131 |
| 2010/0182928 A1* | 7/2010 | Wu et al. | 370/252 |
| 2010/0255794 A1* | 10/2010 | Agnew | H04W 16/14 455/77 |
| 2010/0309806 A1* | 12/2010 | Wu et al. | 370/252 |
| 2011/0099595 A1* | 4/2011 | Lindquist | H04N 21/4383 725/105 |
| 2011/0116458 A1* | 5/2011 | Hsu et al. | 370/329 |
| 2011/0222488 A1* | 9/2011 | Kim | H04W 72/0426 370/329 |
| 2011/0268095 A1* | 11/2011 | Kim | H04W 16/14 370/338 |

* cited by examiner

FIG. 3

| Element ID | Length (8+2*n) | TV bands database access time | Channel Number 1 | Power Constraint 1 | ... | Channel Number n | Power Constraint n |
|---|---|---|---|---|---|---|---|

Octets:   1    1    8    1    1         1    1

FIG. 4

| Element ID | Length (8+2*n) | TV bands database access time | Channel Number 1 | Channel availability type 1 | ... | Channel Number n | Channel availability type n |
|---|---|---|---|---|---|---|---|

Octets:   1    1    8    1    1         1    1

FIG. 5

| Element ID | Length | DSE Registered Location element body field |
|---|---|---|

Octets:   1    1    20

FIG. 6

| B0 | B5 B6 | B30 |
|---|---|---|
| Latitude Resolution | Latitude Fraction | |
| Bits 6 | 25 | |

| B31 | B39 B40 | B45 |
|---|---|---|
| Latitude Integer | Longitude Resolution | |
| Bits 9 | 6 | |

| B46 | B70 B71 | B79 |
|---|---|---|
| Longitude Fraction | Longitude Integer | |
| Bits 25 | 9 | |

| B80 | B83 B84 | B89 B90 | B97 |
|---|---|---|---|
| Altitude Type | Altitude Resolution | Altitude Fraction | |
| Bits 4 | 6 | 8 | |

| B98 | B119 B120 | B122 |
|---|---|---|
| Altitude Integer | Datum | |
| Bits 22 | 3 | |

| B123 | B124 | B125 | B126 | B127 |
|---|---|---|---|---|
| RegLoc Agreement | RegLoc DSE | Dependent STA | Reserved | |
| Bits 1 | 1 | 1 | 2 | |

| B128 | B143 |
|---|---|
| Dependent Enablement Identifier | |
| Bits 16 | |

| B144 | B151 B152 | B159 |
|---|---|---|
| Regulatory Class | Channel Number | |
| Bits 8 | 8 | |

FIG. 7

| Category | Action Value | RequesterSTA Address | ResponderSTA Address | Reason Result Code | Enablement Identifier |
|---|---|---|---|---|---|

Octets:  1  1  6  6  1  2

FIG. 8

| Category | Action Value | RequesterSTA Address | ResponderSTA Address | Reason Result Code | Channel Number |
|---|---|---|---|---|---|

Octets:  1  1  6  6  1  n

FIG. 11

| Link Adaptation Control | Measurement (Sensing) Results Report | Calibration Position | Calibration Sequence | Bandwidth Adaptation | CSI/ Steering | ....... | AC constraint | RDG/ More PPDU |
|---|---|---|---|---|---|---|---|---|

B0 B15 / B16 B23 / B24 B25 / B26 B27 / B28 B29 / B30 B31 / B38 / B39

Bits: 16, 8, 2, 2, 2, 2, 1, 1

FIG. 12

| Incumbent Signal Detection | reserved | Left Adjacent Channel | Right Adjacent Channel |
|---|---|---|---|

B0 B4 / B5 / B6 / B7

Bits: 5, 1, 1, 1

FIG. 13

| Element ID | Length | Measurement Token | Measurement Report Mode | Measurement Type | Measurement Report |
|---|---|---|---|---|---|

Octets: 1, 1, 1, 1, 1, Variable

FIG. 14

| Channel Number | Measurement Start Time | Measurement Duration | Map |
|---|---|---|---|

Octets:     1          8          2          1

FIG. 15

| BSS | Orthogonal frequency division multiplexing (OFDM) preamble | Unidentified Signal | Primary service signal/Radar | Unmeasured | Reserved (0) |
|---|---|---|---|---|---|

Bits:   0      1      2      3      4      5-7

FIG. 16

| BSS | Orthogonal frequency division multiplexing (OFDM) preamble | Unidentified Signal | Primary service signal/Radar | Unmeasured | Adjacent channel | Reserved (0) |
|---|---|---|---|---|---|---|

Bits:   0      1      2      3      4      5-6      7

METHOD FOR OPERATING A STATION IN A WHITE SPACE, AND APPARATUS FOR SAME

This is a U.S. National Phase Entry of PCT Application No. PCT/KR2011/003086, filed Apr. 27, 2011, and claims the benefit of US Provisional Application Nos. 61/328,190 filed Apr. 27, 2010; 61/352,401 filed Jun. 8, 2010; and 61/355,561 filed Jun. 17, 2011.

TECHNICAL FIELD

The present invention relates to a method and apparatus for operating a station (hereinafter referred to as an STA) in a white space, and more particularly to a method for allowing a station (STA), that operates as an unlicensed device to be operated in an available channel not permitted by a licensed device of a white space band, to detect a signal (hereinafter referred to as a primary signal) of the licensed device in such a manner that the STA can be operated in the available channel, and a station device for implementing the same method.

BACKGROUND ART

Standards for WLAN (Wireless Local Area Network) technologies are developed as IEEE 802.11 standards. Among amendments of the IEEE 802.11 standards, IEEE 802.11a/b provide transmission rates of 11 Mbps (IEEE 802.11b) and 54 Mbps (IEEE 802.11a) using an unlicensed band at 2.4 GHz or 5 GHz. IEEE 802.11g provides a transmission rate of 54 Mbps using OFDM at 2.4 GHz. IEEE 802.11n provides a transmission rate of 300 Mbps for 4 spatial streams using MIMO-OFDM (Multiple Input Multiple Output—Orthogonal Frequency Division Multiplexing). IEEE 802.11n supports channel bandwidths of up to 40 MHz and, in this case, provides a transmission rate of 600 Mbps.

IEEE 802.11af standards regulate WLAN operation of an unlicensed device in a TV whitespace zone.

TV whitespace (referred to as 'TVWS' hereinafter) is a frequency allocated to broadcast TV and can include UHF and VHF bands. While the TVWS can include 54 MHz to 698 MHz (US and Korea), part of these frequency bands may not be used for unlicensed devices in some countries.

In a frequency band, an STA operating as an unlicensed device can use an available channel that is not used by a licensed device. Accordingly, it is important for an STA that needs to use TVWS to acquire information about an available channel that is not used by a licensed device. To achieve this, the STA can perform spectrum sensing at the location thereof in order to obtain information on the available channel.

Unlicensed devices using TVWS need to provide a protection function for operations of licensed devices (which may be referred to as 'incumbent users' or 'primary users'). That is, when an incumbent user such as a microphone uses a specific band used by an STA, the STA needs to stop using a channel corresponding to the band in order to protect the incumbent user.

To this end, STAB may require a frequency sensing mechanism. An energy detection scheme, a signature detection scheme and the like can be used as the frequency sensing mechanism. An STA can determine that a band is being used by an incumbent user if the intensity of a received signal exceeds a predetermined value, or when a DTV preamble is detected.

To overcome the problem of coexistence between unlicensed devices, a signaling protocol such as a common beacon frame, a frequency mechanism, or the like may be required for the unlicensed devices.

DISCLOSURE

Technical Problem

If an STA that operates as the unlicensed device at a TVWS depends upon only frequency sensing to obtain available channel information, load caused by the sensing of a TVWS operation of the STA is excessively increased and a necessary procedure may be delayed. STA sensing information may have the probability error such as false alarm, miss detection, and the like, so that more precise information is requested according to location information.

An object of the present invention is to provide a mechanism for allowing an STA operating as an unlicensed device at TVWS to obtain information regarding an available channel from a database (DB) on the basis of location information, and efficiently utilizing the measurement result for detecting a primary signal so that update of database information, reporting of the measurement result, and reporting at a Dynamic Station Enablement (DSE) procedure can be performed, as well as to provide an apparatus for the mechanism.

Technical Solution

The object of the present invention can be achieved by providing a method for operating a station (STA) in a white space band, in which the station operating as an unlicensed device with permission to operate in an available channel that is not used by a licensed device operates in the white space band by detecting a primary signal of the licensed device, the method including: receiving white space map (WSM) information including identification information of an available channel from a device having database information; obtaining a measurement result indicating detection of the presence or absence of the primary signal in a specific band range; and transmitting an updated WSM including information of the band in which the primary signal was detected to another station, wherein the updated WSM further includes specific information indicating whether each available channel belonging to the updated WSM is based on either the database information or the measurement result.

The station may be an access point (AP), and the measurement result indicating detection of the presence or absence of the primary signal may be obtained either through measurement of the access point (AP) or by receiving a measurement result report of another station provided with the access point (AP).

The station may be a station but not an access point (AP), the measurement result indicating detection of the presence or absence of the primary signal may be obtained through station measurement but not access point (AP) measurement, and the station but not the access point (AP) may transmit the updated WSM to an access point (AP) configured to transmit a service to the station but not the access point (AP).

The updated WSM may include specific information indicating (1) whether each available channel belonging to the updated WSM is indicated as an available channel by both the database information and the measurement result, (2) whether each available channel is indicated as an available channel by the database information but the primary signal for the measurement result is detected, and (3) whether each available channel is not indicated as an available channel by the database information and the primary signal for the measurement result is not detected.

The WSM and the updated WSM may further include maximum transmit (Tx) power information allowed in an available channel identified by the available channel identification information. The updated WSM may be indicated as an available channel by the database information, and may represent maximum power information, that is allowed in the channel in which the primary signal for the measurement result was detected, as a specific value (for example, 0 Watt).

The another station having received the updated WSM may be configured to scan channels indicated by available channels in the updated WSM. The another station having received the updated WSM may be indicated as an available channel by the database information in the updated WSM, and may be configured to scan even a specific channel in which the primary signal for the measurement result was detected.

The method may further include: receiving an enablement signal from a specific access point (AP); and transmitting a dynamic station enablement (DSE) request message to the specific access point (AP), wherein the DSE request message includes information regarding the band in which the primary signal was detected.

If the primary signal is detected in a channel indicated by the enablement signal, the DSE request message may include a reason result code having a predetermined code value indicating that the primary signal was detected in the channel indicated by the enablement signal, so that the reason result code is transmitted to the specific access point (AP).

The method may further include: receiving a message indicating switching to another channel through an extended channel switching announcement frame from the specific access point (AP); and performing channel switching to a channel indicated by the extended channel switching announcement frame.

In another aspect of the present invention, a method for operating a station (STA) in a white space band, in which the station operating as an unlicensed device with permission to operate in an available channel that is not used by a licensed device operates in the white space band by detecting a primary signal of the licensed device includes: receiving an enablement signal from a specific access point (AP); obtaining a measurement result indicating detection of the presence or absence of the primary signal in a specific band range; and transmitting a dynamic station enablement (DSE) request message to the specific access point (AP), wherein the DSE request message includes information regarding the band in which the primary signal was detected.

The DSE request message, if the primary signal is detected in a channel indicated by the enablement signal, may include a reason result code having a predetermined code value indicating that the primary signal was detected in the channel indicated by the enablement signal, so that the reason result code is transmitted to the specific access point (AP).

The method may further include: receiving a message indicating switching to another channel through an extended channel switching announcement frame from the specific access point (AP); and performing channel switching to a channel indicated by the extended channel switching announcement frame.

The method may further include: receiving white space map (WSM) information including identification (ID) information of an available channel from a device having database information; and transmitting an updated WSM including information regarding the band in which the primary signal was detected to another station, wherein the updated WSM further includes specific information indicating whether each available channel belonging to the updated WSM is based on either the database information or the measurement result.

In another aspect of the present invention, a station (STA) for operating as an unlicensed device with permission to operate in an available channel that is not used by a licensed device operating in the white space band includes: a transceiver configured to receive white space map (WSM) information including identification information of an available channel from a device having database information; and a processor functionally connected to the transceiver, which obtains a measurement result indicating detection of the presence or absence of the primary signal in a specific band range, updates white space map (WSM) information to include information regarding the band in which the primary signal was detected, and controls the transceiver to transmit the updated WSM to another station. The updated WSM further includes specific information indicating whether each available channel belonging to the updated WSM is based on either the database information or the measurement result.

Advantageous Effects

In accordance with the above-mentioned embodiments, the STA operating as an unlicensed device at TVWS can obtain information regarding an available channel from a database (DB), can efficiently use the measurement result for detecting a primary signal, and can update DB information, report the measurement result, and report a DSE procedure, so that a WLAN operation can be more efficiently performed in a white space.

DESCRIPTION OF DRAWINGS

The accompanying drawings, which are included to provide a further understanding of the invention, illustrate embodiments of the invention and together with the description serve to explain the principle of the invention.

FIG. 3 is a diagram showing a WSM (White Space Map) structure according to one embodiment of the present invention.

FIG. 4 is a diagram showing a WSM structure according to one embodiment of the present invention.

FIGS. 5 and 6 illustrate a DSE registered location element format prescribed in IEEE 802.11y standard and a DSE registered location element body field format.

FIG. 7 is a diagram showing a DSE enablement frame format.

FIG. 8 is a diagram illustrating a deenablement frame format according to one embodiment of the present invention.

FIG. 11 is a diagram illustrating fields capable of being contained in a TVWS control field of FIG. 10.

FIG. 12 is a diagram illustrating a measurement result report subfield format.

FIGS. 13 to 15 are diagrams illustrating a measurement report frame format.

FIG. 16 is a diagram illustrating a measurement report frame format according to one embodiment of the present invention.

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

In some cases, in order to prevent ambiguity of the concepts of the present invention, conventional devices or apparatuses well known to those skilled in the art will be omitted and be denoted in the form of a block diagram on the basis of important functions of the present invention. Wherever possible, the same reference numbers will be used throughout the drawings to refer to the same or like parts.

Figure 1:
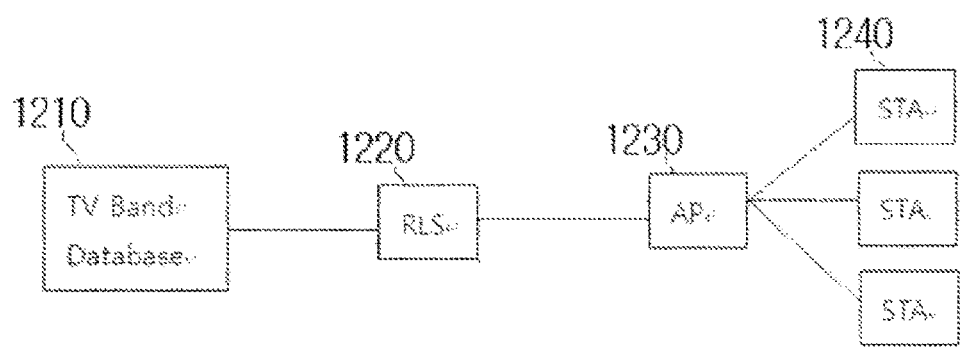
FIG. 1 is a block diagram illustrating a system structure applicable to the present invention.

FIG. 1 is a block diagram illustrating a system structure applicable to the present invention.

An IEEE 802.11 TVWS STA is an unlicensed device that operates using an IEEE 802.11 MAC layer and PHY layer in a TVWS frequency band. STAB operating in a TVWS frequency band may be classified according to roles thereof into an STA 1230 operating as an AP (Access Point) and STAB 1240 provided with a service by the specific AP 1230.

The following embodiments of the present invention will be described on the assumption that the STAB 1230 and 1240 operating as unlicensed devices in TVWS use database information having available channel data according to regional locations thereof in order to acquire information on available channels.

A database 1210, for example, a TV band database may have information on available channels in a TV band. This database information includes considerably accurate location-based information of about 50 m, in general. An RLS (Registered Location Server) 1220 may be a server including information on registered locations of all APs operating in TVWS. While FIG. 1 illustrates the TV band database 1210 and the RLS 1220 as separate devices, they may be implemented as one TV band database device.

If an STA operating as an unlicensed device in TVWS needs to operate as an AP, the STA should register the location thereof in the RLS 1220. The AP 1230 can acquire available channel information of the database according to registrations. Then, the AP 1230 can provide the database information to the STAB 1240 that belong thereto.

Figure 2:
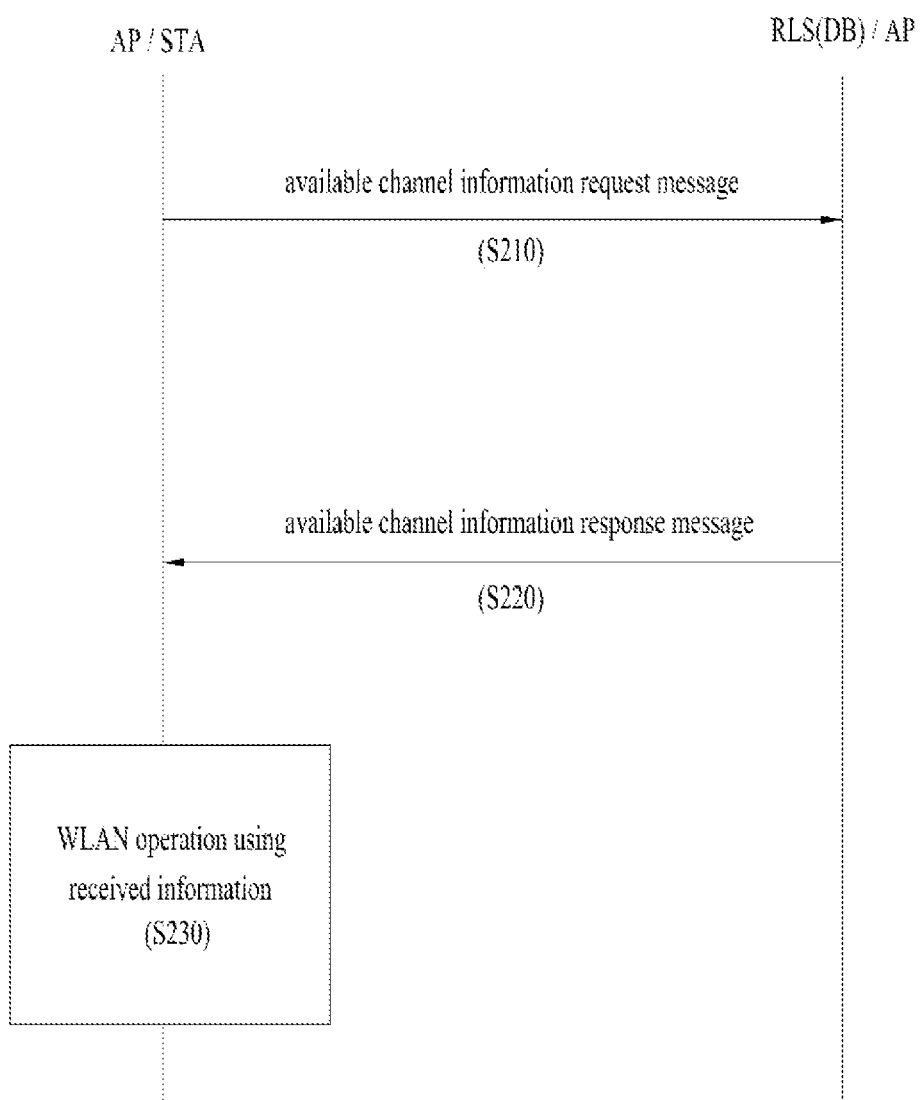
FIG. 2 is a flowchart illustrating a method for operating an STA by obtaining n available channel information from a device having database information.

FIG. 2 illustrates a method in which an STA operates by acquiring available channel information from a device having database information according to an embodiment of the present invention.

An STA operating as an unlicensed device in TVWS can transmit an available channel information request message to a device having database information (S210). The STA that transmits the available channel information request message may be an AP or an STA provided with a service by a specific AP. Specifically, the AP can transmit the available channel information request message to an RLS or database serving as a device having database information. Otherwise, an AP that has acquired database information according to this method can function as a device having database information and STAB belonging to the AP can transmit the available channel information request message to the AP.

The available channel information request message may have a format as shown in Table 1.

TABLE 1

| Order | Information |
|---|---|
| 1 | Category |
| 2 | Action |
| 3 | Destination MAC Address |
| 4 | Source MAC Address |
| 5 | Supported Channels |

As shown in Table 1, the available channel information request message according to the current embodiment of the present invention may include a category field, an action value field, a source address field, a destination address field, and a field indicating supported channels for one or more available channels.

The category field can represent the category of the available channel information request message, and the action value field can indicate an action to be performed through the available channel information request message in the category. The source address field can represent the address of an AP that transmits the available channel information request message. If an STA belonging to a specific AP transmits the available channel information request message, the source address field can indicate the address of the STA. The destination address field can indicate the address of an RLS (DB) when the RLS (DB) receives the available channel information request message and indicate the address of an AP when the AP receives the available channel information request message. Furthermore, the available channel information request message can include information on channels supported by an STA that transmits the available channel information request message. When the information indicates a plurality of channels, the available channel information request message can be transmitted in the form of a list of the plurality of channels.

The RLS (DB) or AP that has received the available channel information request message can transmit an available channel information response message to the AP or STA in response to the available channel information request message (S220). In the current embodiment, the available channel information response message includes the following information.

(a) Identification information on an available channel (b) Information on the maximum allowable power level in the available channel (c) Information on valid time of the available channel In another exemplary embodiment of the present invention, the available channel information response message may be transmitted without information on the maximum allowable power level in the available channel according to use of the available channel information response message. When the available channel information response message does not include the information on the maximum allowable power level in the available channel, it can be considered that only an action associated with the information of (b) is omitted. Thus, the following description is made on the assumption that the available channel information response message includes all the information of (a), (b) and (C) for convenience of explanation. However, it is noted that the action associated with the information of (b) can be omitted.

Different maximum power levels may be allowed for available channels that can be used by unlicensed devices in TVWS. For example, when CH1, CH2 and CH3 are indicated as available channels, different maximum transmit power levels may be allowed for the respective channels in consideration of the influence on a neighboring channel. For example, maximum transmit power values of 40 mW, 100 mW and 40 mW can be respectively allowed for CH1, CH2 and CH3. Information on a maximum allowable power level in an available channel can indicate the maximum allowable power for the available channel. This maximum allowable power may be maximum allowable power conforming to FCC regulations.

The information on valid time of the available channel can indicate information on a time for which a device that has received the available channel information response message is allowed to use the available channel. As described above, an unlicensed device operating in TVWS needs to execute a function of protecting an incumbent user. It is possible to efficiently control the function of protecting the incumbent user by informing the device of the information on the valid time of the available channel when the information on the available channel is indicated. For example, when valid time for an available channel is 10 minutes, an AP/STA that has received this information can use the available channel for 10 minutes from when the information is received. After the lapse of the valid time, the AP/STA can transmit the available channel information response message to a device (RLS (DB)/AP) having database information to acquire available channel information.

The number of each of the information elements of (a), (b) and (c) can correspond to the number of available channels. Table 2 shows an example of the available channel information response message.

TABLE 2

| Order | Information |
| --- | --- |
| 1 | Category |
| 2 | Action |
| 3 | Destination MAC Address |
| 4 | Source MAC Address |
| 5 | Target Channel(s) |
| 6 | White Space Available Time(s) |
| 7 | Power Constraint(s) |

Category, action value, destination address, and source address fields in Table 2 correspond to those shown in Table 1. In Table 2, "Target Channel(s)" may include (a) identification information on an available channel that will be used by an STA receiving the available channel information response message for a WLAN operation, and "White Space Available Time(s)" may include (b) information on valid time of the available channel. Further, "Power Constraint(s)" may represent maximum allowable transmit power for each available channel.

Upon reception of the available channel information, the device performs a WLAN operation using the received information (S230). Specifically, the device that has received the available channel information can transmit/receive a WLAN signal using power within the designated maximum allowable power for the designated valid time in the available channel according to the received information. If a specific AP receives the available channel information response message from an RLS (DB), the AP can transmit some or all of the received information to STAB belonging thereto. If an STA belonging to the specific AP receives the available channel information response message from the AP, the STA can limit a WLAN operation to an available channel indicated by the received available channel information response message in such a manner that the STA performs a scanning operation for network connection only for the designated available channel, to thereby mitigate scanning/sensing loads. In the following description, the aforementioned available channel information is simply referred to as a WSM (White Space MAP).

FIG. 3 is a diagram showing a WSM (White Space Map) structure according to one embodiment of the present invention.

Referring to FIG. 3, the element ID field may represent that this information element is a WSM. In addition, the WSM embodiment shown in FIG. 3 assumes that a WSM includes an available channel number and power constraint of the corresponding available channel, such that the length field has the length of 8+2*n octets according to the number (n) of available channels.

On the other hand, the TV band access time field has the length of 8 octets, and the TV band access time field may represent access time information of the STA connected to a TV band database. In addition, the channel number field may represent an available channel number, and it is assumed that the channel number field represents a TV channel number. Meanwhile, the power constraint field may indicate maximum transmit power allowed by an available TV channel indicated by the channel number field.

WLAN Measurement and WSM Update

The measurement operation to be performed by an unlicensed device in a white space band will hereinafter be described in detail.

Wireless LAN (WLAN) measurement allows a plurality of STAB to understand wireless environments including the STAB. WLAN wireless measurement can allow each STA to observe/collect not only wireless link throughput but also wireless environment data. For measurement, one STA may allow another STA to perform measurement, or may receive a measurement request from another STA. If the STA transmits a measurement request to another STA, it can receive information regarding the measurement result from the corresponding STA. If one STA receives a measurement request from the other STA, it can provide the measurement result to the other STA. In accordance with one embodiment of the present invention, the STA is operated on the basis of an available channel indicated by a WSM obtained from a database in a white space band. If a primary signal is detected from a specific channel indicating the measurement result, one STA updates a WSM to protect a primary user and informs another STA of the updated result.

In case of performing the above-mentioned WSM update, this embodiment of the present invention proposes a method for allowing AP and/or STA to display the source of WSM.

That is, AP and/or STA according to the embodiment of the present invention is configured to inform another STA whether the corresponding WSM is based on either information of a TV band database or the measurement result.

FIG. 4 is a diagram showing a WSM structure according to one embodiment of the present invention.

Compared to the WSM structure of FIG. 3, the WSM structure of FIG. 4 further includes a channel availability type field. The channel availability type field can indicate (1) whether the corresponding available channel is indicated as an available channel by both database information and the measurement result, (2) whether the corresponding available channel is indicated as an available channel by database information but the measurement result primary signal is detected, and (3) whether the corresponding available channel is not indicated as an available channel by database information and the measurement result primary signal is not detected. In more detail, if the channel available type field is set to 1, this means that the corresponding available channel is indicated as an available channel by both database information and the measurement result. If the channel available type field is set to 2, this means that the corresponding available channel is indicated as an available channel by database information and the measurement result primary signal is detected. If the channel available type field is set to 3, this means that the corresponding available channel is not indicated as an available channel by database information and the measurement result primary signal is not detected. However, the scope or spirit of the present invention is not limited thereto, and the channel available type field may be assigned other values and other functions.

On the other hand, although the power constraint field is omitted from the WSM structure of FIG. 3 so that the WSM structure of FIG. 4 is configured, it should be noted that the WSM structure of FIG. 4 may further include the power constraint field as shown in FIG. 3. In accordance with one embodiment of the present invention, the power constraint field value is established as a specific value (for example, 0 Watt) so as to indicate a channel where the measurement result primary signal was detected from the updated WSM, so that the corresponding available channel is indicated as an available channel by database information, but it can be recognized that the measurement result primary signal was detected from the corresponding channel.

On the other hand, information indicating whether the measurement result primary signal is detected may be changed according to the position of STA that performs measurement. Therefore, the corresponding channel may be an available channel in another position belonging to the same BSS. As a result, the STA according to one embodiment of the present invention may be configured to perform scanning of the corresponding channel under the condition that a specific channel of the updated WSM is indicated as an available channel on the basis of database information and the measurement result primary signal is detected from the specific channel.

The channel availability type 1 indicates that the corresponding channel is identified as available both from database and spectrum sensing. The channel availability type 2 indicates that the corresponding channel is identified as available from database but it is not identified as available from spectrum sensing. The channel availability type 3 indicates that the corresponding channel is not identified as available from database but it is identified as available from spectrum sensing.

The entity configured to perform measurement and/or WSM update may be an AP or an STA provided with the AP.

The AP receives the measurement result from the STA, such that it may perform WSM update. Otherwise, the AP may directly perform measurement so as to perform WSM update. In addition, after a non-AP STA performs measurement, the non-AP STA may provide the updated WSM as described above.

Measurement Result Utilization in DSE Procedure

On the other hand, the above-mentioned primary signal measurement result may also be used for a Dynamic Station Enablement (DSE) procedure.

The following embodiment of the present invention relates to a method for informing an AP, that operates in an enablement procedure, of specific information indicating that a primary service signal was detected in an enablement procedure in which transmission of an STA signal is allowed in a TV white space, such that the AP can recognize the specific information during the enablement procedure.

If an unlicensed device operates in a licensed band such as a TV white space (TVWS), two modes for STA are generally defined. That is, STAB can be classified into an enabling STA and a dependent STA.

The enabling STA can enable other dependent STAB. Although the enabling STA does not receive the enabling signal, it can transmit signals and initiate a network. In contrast, the dependent STA is configured to transmit signals only when receiving the enabling signal, and it can be operated under the control of the enabling STA.

On the other hand, STA capable of transmitting the enabling signal includes not only the enabling STA but also the dependent AP STA. The dependent STA can be enabled by either the enabling STA or the dependent AP STA.

FIGS. 5 and 6 illustrate a DSE registered location element format prescribed in IEEE 802.11y standard and a DSE registered location element body field format.

IEEE 802.11y standard was configured to operate one or more unlicensed devices at 3.5 GHz. The IEEE 802.11y standard includes the above-mentioned enabling procedure, and associated procedure is referred to as a dynamic STA enablement (DSE). In accordance with the IEEE 802.11y standard, the enabling STA can transmit a DSE registered location element in which a RegLoc DSE bit is set to 1 as an enablement signal. The DSE registered location element format is shown in FIG. 5, and the DSE registered location element body field format is shown in FIG. 6.

The corresponding element is transmitted to a beacon or a probe response frame. If a dependent STA receives and decodes the above element, the dependent STA transmits an enablement request frame for a channel indicated by the corresponding element. Thereafter, if the dependent STA receives an enablement response frame, the enablement procedure of the corresponding STA is completed. If the enabling STA enables the dependent STA through the above-mentioned procedure, the corresponding dependent STA is enabled.

FIG. 7 is a diagram showing a DSE enablement frame format.

Referring to FIG. 7, the enabling STA transmits a DSE enablement frame when enabling the dependent STA. In this case, a dependent enablement identifier of 16 bits is allocated for the corresponding dependent STA as shown in FIG. 7. The enablement identifier is used to allocate a unique ID among STAB enabled by the corresponding enabling STA. If a DSE enablement frame is not transmitted by the enabling STA, the enablement identifier may be set to zero '0' so that the enablement identifier of 0 is transmitted.

On the other hand, the DSE enablement frame may be used as an enablement request frame or an enablement response frame according to reason result codes. The reason result codes have been defined to have the following values as shown in Table 3.

TABLE 3

| Reason Result Code field value | Description |
| --- | --- |
| 0 | Reserved |
| 1 | Reserved |
| 2 | Enablement requested |
| 3 | Success |
| 4 | Request declined |
| 5 | Request not successful as one or more parameters have invalid values |
| 6 | Enablement denied because the enabling STA is unable to handle additional dependent STAs |
| 7 | Handshake timeout |
| 8-255 | Reserved |

In accordance with one embodiment of the present invention, if the STA recognizes the presence of a primary signal through measurement when transmitting the above-mentioned enablement request frame, an enablement request frame including information of a channel in which the primary signal was detected can be transmitted. In addition to the DSE enablement frame format shown in FIG. 7, the above-mentioned enablement request frame may further include a specific field indicating information of the channel where the primary channel was detected. That is, the STA that has detected the primary service signal may attach a channel map of the detected channel to the enablement request frame. In this case, a number of a TV channel in which the primary service signal was detected may be signaled.

On the other hand, there may arise an exemplary case in which the primary signal is detected in a channel indicated by the enablement signal so that it is impossible to enable the corresponding channel. In accordance with one embodiment of the present invention, in order to indicate the above case in which the primary signal was detected in the channel indicated by the enablement signal, the reason result code can be modified as shown in the following table 4.

TABLE 4

| Reason Result Code Field Value | Description |
| --- | --- |
| 0 | Reserved |
| 1 | Reserved |
| 2 | Enablement requested |
| 3 | Success |
| 4 | Request declined |
| 5 | Request not successful as one or more parameters have invalid values |
| 6 | Enablement denied because the enabling STA is unable to handle additional dependent STAs |
| 7 | Handshake timeout |
| 8 | Enablement requested but Primary Service Signal is detected |
| 9-255 | Reserved |

That is, under the condition that the STA attempts to transmit an enablement request frame to the corresponding AP or the enabling STA by receiving/decoding the registered location element in which an LCI field sent to a beacon frame is set to 1, provided that the STA detects a primary service signal over the corresponding channel, the STA transmits the enablement request frame, and informs the enabling STA or the dependent AP STA of detection of the primary service signal by establishing the value of the reason result code of Table 4 as a specific value (for example, 8).

On the other hand, according to the present frequency policy rules, assuming that the primary service signal is detected, the unlicensed device should stop using the corresponding channel within two seconds. Therefore, according to this embodiment, the STA is not yet associated with the corresponding AP so that it can transmit the enablement request message using the enablement frame and informs the STA/AP of the enablement request message transmission information, whereas the related art cannot report detection of the primary service signal. As a result, the STA or AP according to this embodiment of the present invention can move to another channel within 2 seconds after detecting the primary signal.

In more detail, according to this embodiment of the present invention, the enabling STA/AP having received the above-mentioned enablement request frame stops using the corresponding channel, and can transmit the extended channel switch announcement frame so as to perform switching to another channel. Since enabling STA/AP has already received the enablement request from a specific STA, the enablement response message is transmitted to the corresponding STA over the switched channel so that the DSE procedure can be completed.

In accordance with another embodiment of the present invention, if detection of the primary service signal is indicated through the enablement request frame as descried above, the enablement STA/AP having received the primary service signal can transmit a deenablement frame for the corresponding STA.

FIG. 8 is a diagram illustrating the deenablement frame format according to one embodiment of the present invention.

Referring to FIG. 8, the deenablement frame according to one embodiment of the present invention may specify a channel in which the primary service signal was detected (using the channel number field), such that it can disable the corresponding STA. In addition, the reason of such deenablement relates to the primary service signal, so that it may be possible to use a method for adding a specific field indicating detection of the primary service signal to the reason result code of the deenablement frame. An example of the reason result code is shown in the following table 5.

TABLE 5

| Reason Result Code Field Value | Description |
| --- | --- |
| 0 | Reserved |
| 1 | Reserved |
| 2 | Deenablement requested |
| 3 | Success |
| 4 | Reserved |
| 5 | Request not successful as one or more parameters have invalid values |
| 6 | Deenablement requested and Primary Service Signal is detected |
| 7-255 | Reserved |

Similarly, assuming that the enabling STA detects the primary service signal over the corresponding channel when transmitting a DSE enablement frame, the enabling STA transmits an enablement frame by detecting the primary service signal in the reason result code field, so that it can be recognized that enablement rejection is based on detection of the primary service signal.

If the reason result code obtained when the deenablement frame is transmitted is set to a specific value indicating detection of the primary service signal, the STA having detected the corresponding primary service signal may add a channel map of the channel detected after lapse of the reason result code field of the deenablement frame. That is, a TV channel number having detected the primary service signal may be signaled.

Control Field Design Unique for TVWS Using the Measurement Result

In accordance with another aspect of the present invention, when the AP communicates with the STA at a TVWS frequency according to IEEE 802.11 WLAN communication, a whitespace specific control field suitable for whitespace characteristics can be defined as follows.

TV Band Devices (BDs) such as AP and STA operating at TVWS can utilize about 30 channels, each of which uses 6 MHz as a basic transmission unit. In fact, in order to use such channels, it should be premised that the incumbent user does not use a channel to be used. Since a basic unit for each channel is 6 MHz, a minimum channel bandwidth must be decided in units of 5 MHz when IEEE 802.11 WLAN based communication is achieved at TV WS. In addition, TV BDs can support 10 MHz and 20 MHz channel bandwidths on the basis of specific information indicating how many contiguous channels were empty.

Although the following embodiments will exemplarily disclose supportable channel bandwidths of 5 MHz, 10 MHz and 20 MHz, the scope or spirit of the present invention is not limited thereto, and other channel bandwidths can also be used without difficulty.

A channel bandwidth needed when STA/AP perform communication at TVWS is determined according to the number of available channels. In this case, the number of available channels at TVWS may be changed according to time. The incumbent user corresponding to the primary user at TVWS must be protected and at the same time STA/AP must perform communication at TVWS. If the primary user signal is detected at a channel used at a specific time, the use of the corresponding channel needs to be stopped.

Figure 9:
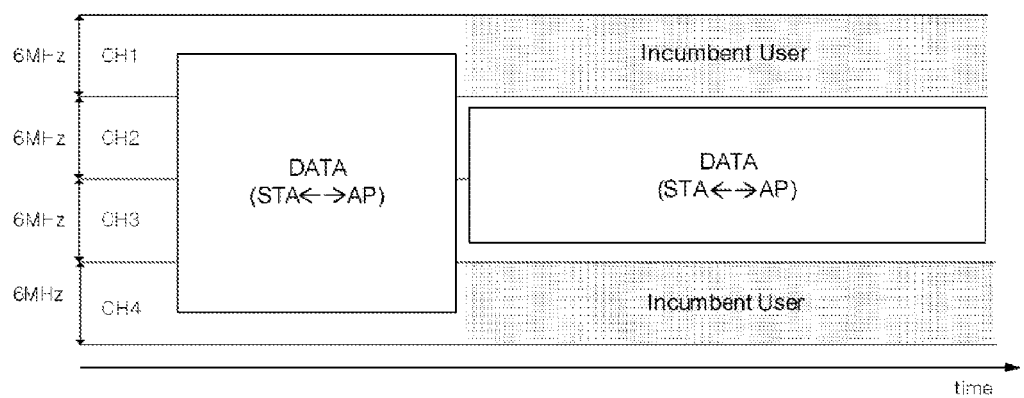
FIG. 9 is a conceptual diagram illustrating the operations of AP/STA configured to perform communication using a time-variant bandwidth according to one embodiment of the present invention.

FIG. 9 is a conceptual diagram illustrating the operations of AP/STA configured to perform communication using a time-variant bandwidth according to one embodiment of the present invention.

For example, assuming that channels #1-#4 are being used by STA/AP as shown in FIG. 9, if the primary user signal occurs in channels #1 and #4, STA/AP must stop using the corresponding channels. In other words, as can be seen from FIG. 9, STA/AP according to one embodiment of the present invention must use channels #2 and #3 other than some channels in which the primary user signal has been detected, so that it is preferable that communication is achieved at a smaller channel bandwidth.

Figure 10:
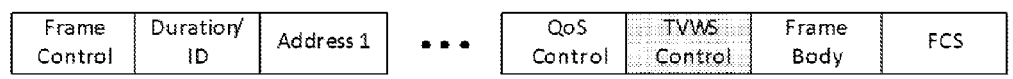
FIG. 10 is a conceptual diagram illustrating a control field unique for TVWS according to one embodiment of the present invention.

FIG. 10 is a conceptual diagram illustrating a control field unique for TVWS according to one embodiment of the present invention.

If STA/AP is operated in a TVWS band as described above, a channel bandwidth used by the STA/AP may be unexpectedly changed to another channel, so that specific information indicating the above situation must be signaled.

Therefore, one embodiment of the present invention proposes a method for defining a TVWS control field in the MAC frame and signaling the defined information as shown in FIG. 10.

FIG. 11 is a diagram illustrating fields capable of being contained in a TVWS control field of FIG. 10.

Referring to FIG. 11, information that must be contained in the TVWS control field of FIG. 10 may include information regarding a channel bandwidth, information indicating whether the primary user signal was detected in the incumbent channel being used, information indicating whether the primary user signal was detected in a neighbor channel, information regarding a transmit power level caused by the measurement/sensing result, and information associated with link adaptation.

Under the condition that STA/AP uses a TVWS channel and the primary user currently uses the corresponding TVWS channel, the STA/AP must stop using the corresponding channel and must be shifted to another channel within a short time. Accordingly, the aforementioned information is contained in the whitespace control field, so that it is possible to protect the primary user signal from the STA/AP operated at TVWS.

One embodiment of the present invention can also provide a method for protecting the primary user by reducing transmit power of the corresponding channel according to frequency regulations even when the primary user has been detected in a contiguous channel. Therefore, if the primary user signal is detected in a contiguous channel, AP/STA operated at TVWS may preferably reduce a signal transmission power level to a predetermined level and transmit a necessary signal at low signal transmission power. Preferably, the measurement (or sensing) result may be reported through the TVWS control field in such a manner that the current transmit power level can be indicated and at the same time the corresponding primary user signal can be quickly detected by the receiver.

If AP/STA receives a MAC frame including a TVWS control field indicating that the primary user signal was detected in a contiguous channel, the AP/STA may preferably reduce transmit power of its own co-channel to a predetermined power level.

In accordance with this embodiment of the present invention, the measurement (or sensing) result of the primary user signal is contained in a control field, and the amount of information to be reported may be changed according to a maximum channel bandwidth supported by TVWS. Assuming that a maximum channel bandwidth supported by TVWS supports 20 MHz, specific information indicating whether the primary user signal for each 6 MHz TVWS channel was detected can be signaled to a channel being used by the AP/STA using 5 bitmaps and a maximum of 5 6 MHz-based TVWS channels. However, assuming that AP/STA operated at TVWS occupies 5 or less TVWS channels, for example, assuming that the AP/STA perform communication through a 10 MHz bandwidth by occupying two channels, when the primary user signal detection field for the corresponding channel is signaled, the measurement (or sensing) results of two channels are reported using only 2 bits, and the remaining bit field may be established as a default value.

It is possible to report, through 2 bits, the primary user signal detection result associated with both contiguous channels of a channel continuously used by the AP/STA.

FIG. 12 is a diagram illustrating a measurement result report subfield format.

The STA/AP operated at TVWS can signal specific information indicating whether the primary user signals for left/right adjacent channels have been detected, using the left/right adjacent channel fields of FIG. 12. The STA/AP, that has detected the primary user signal at the right adjacent channel or the left adjacent channel, may allocate a specific value to a field of an adjacent channel in which the primary user signal was detected, and at the same time the transmit power may be reduced to a predetermined level so that signals can be transmitted at a low transmit power.

Assuming that the channel bandwidth is not adjusted, the STA/AP having received such non-adjustment of the channel bandwidth may preferably reduce the transmit power to a predetermined level.

The signaling scheme using the measurement result report subfield will hereinafter be described with reference to FIG. 9. If the STA/AP configured to communicate with each other at a channel bandwidth of 20 MHz using four TVWS channels does not detect the primary user signal, the primary user signal detection field may be set to, for example, "00000". However, when the primary user signal is detected at channels #1 and #4, the primary user signal detection field may be set to "10010". In this case, since the STA/AP occupy four channels, the last bit "0" may be interpreted as a dummy bit.

It may be possible to support bandwidth adaptation on the basis of the above-mentioned measurement result report field. That is, based on the primary user signal detection result, the STA/AP can recognize whether the primary user signal was detected, and can recommend a desired adaptation bandwidth according to the position of a channel in which the corresponding primary user signal was detected.

Referring to FIG. 9, the STA/AP stops using a channel in which the primary user signal was detected, so that it can reduce the channel bandwidth. Accordingly, the STA/AP having detected the primary user signal can recommend channel switching to 10 MHz. Such information can be signaled through the bandwidth adaptation field of the TVWS control field shown in FIG. 11. Assuming that supportable channel bandwidths are 5 MHz, 10 MHz, and 20 MHz, although the present channel bandwidth for use in the above-mentioned example is 20 MHz, the primary user can use channels #1 and #4, so that a current bandwidth can be changed to a bandwidth of 10 MHz.

The adjacent channel fields of FIG. 12 can also be interpreted in different ways as necessary. Another embodiment of the present invention proposes a method for signaling whether or not the primary user detection result of the measured channel affects Tx power of an adjacent channel. That is, if the primary signal is detected at a channel measured by the STA, this embodiment can inform each of left/right channels of specific information indicating whether Tx power of an adjacent channel is restricted according to whether the primary signal is detected at the corresponding channel. In case of performing the above-mentioned measurement result report, it is preferable that information indicating whether the primary signal is detected at the measurement channel be limited to only one bit. The scheme for reporting the STA measurement result may modify or add not only the TVWS control field proposed by this embodiment but also the measurement report format defined in IEEE 802.11, or may also define/report a new measurement report format.

FIGS. 13 to 15 are diagrams illustrating a measurement report frame format.

Assuming that the measurement type field of the measurement report frame format shown in FIG. 13 represents a basic report type, the measurement report field is configured as shown in FIG. 14. In case of the basic measurement report, the map field is configured as shown in FIG. 15.

FIG. 16 is a diagram illustrating a measurement report frame format according to one embodiment of the present invention.

If the primary signal detection result of a specific channel measured by the STA affects the operations of other channels contiguous to the corresponding channel as shown in FIG. 16, for example, if the maximum transmit (Tx) power at an adjacent channel is restricted, this information can be signaled using 2 bits at the adjacent channel field. Examples for signaling information using 2 bits can be configured as shown in the following table 6.

TABLE 6

| Adjacent Channel bit field | Interpretation |
|---|---|
| 00 | Neither Right nor Left Adjacent Channel Power Reduction Required |
| 01 | Right Adjacent Channel Power Reduction Required |
| 10 | Left Adjacent Channel Power Reduction Required |
| 11 | Both Right and Left Adjacent Channel Power Reduction Required |

Configuration of Apparatus

Figure 17:
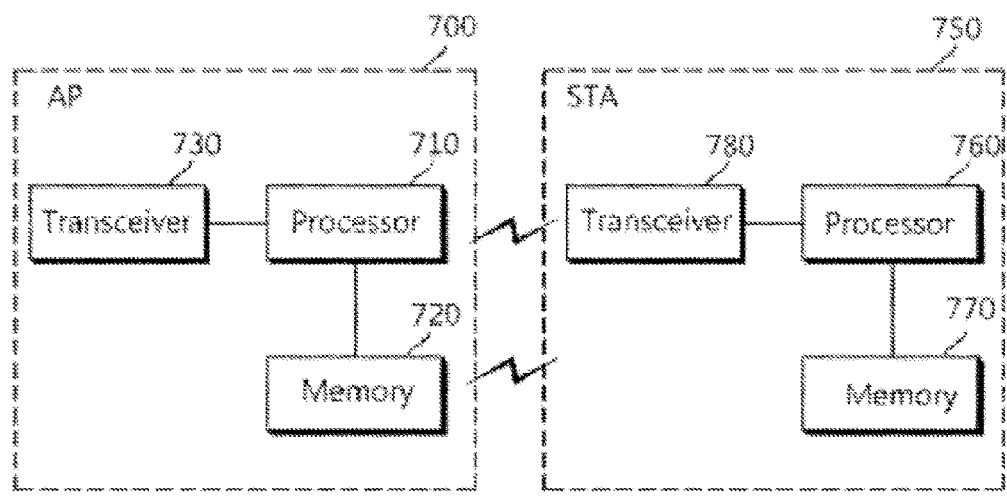
FIG. 17 is a block diagram illustrating an AP device and an STA device according to an embodiment of the present invention.

FIG. 17 is a block diagram illustrating an AP device and an STA device according to an embodiment of the present invention.

Referring to FIG. 17, the AP 700 and STA 750 include transceivers 730 and 780, processors 710 and 760, and optionally memories 720 and 770, respectively. In the WLAN system shown in FIG. 1, the database and/or RLS may have a configuration similar to the configuration shown in FIG. 1.

AP 700 or STA 750 operating as the unlicensed device allowed in an available channel that is not used by the licensed device of a white space band will hereinafter be described in detail. AP 700 or STA 750 includes the transceiver 730 or 780 configured to receive WSM information including identification (ID) information of the available channel from a device having database information, and the processor 710 or 760 functionally connected to the transceivers 730 or 780, respectively. The processor 710 or 760 obtains the measurement result indicating the presence or absence of the primary signal in a specific band range, updates a WSM in such a manner that a specific band includes information regarding a band in which the primary signal was detected, and allows the transceiver 730 or 780 to transmit the updated WSM to another station (STA). In this case, the updated WSM may further include specific information indicating whether each available channel of the updated WSM is based on either database information or the measurement result.

The processor 710 or 760 may store the acquired information in the memory 720 or 770 as necessary, and may configure a frame on the basis of the stored information and transmit the configured frame through the transceiver 730 or 780.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

Although the above-mentioned embodiments have been disclosed on the basis of only the IEEE 802.11 based system for convenience of description, the scope or spirit of the present invention is not limited thereto. That is, the above-mentioned embodiments can also be applied to various mobile communication systems capable of being driven when the unlicensed device obtains available channel information according to the same principles as those of the IEEE 802.11 based system.

The invention claimed is:

1. A method for operating a station (STA) in a white space band, in which the station operating as an unlicensed device with permission to operate in an available channel that is not used by a licensed device operates in the white space band by detecting a primary signal of the licensed device, the method comprising:
receiving a white space map (WSM) including one or more identification information of available channels from a device having database information;
obtaining a measurement result indicating detection of the presence or absence of the primary signal in a specific channel;
changing channel availability of the specific channel which is indicated as available in the WSM, including setting a Type field value to a specific value indicating that channel availability in the WSM is identified from database or the measurement result, when the measurement result indicates that primary signal is measured on the specific channel, by the device having database information; and
transmitting the WSM to another station,
wherein an updated WSM includes specific information indicating:
whether each available channel belonging to the updated WSM is indicated as an available channel by both the database information and the measurement result,
whether each available channel is indicated as an available channel by the database information but the primary signal for the measurement result is detected, and
whether each available channel is not indicated as an available channel by the database information and the primary signal for the measurement result is not detected.

2. The method according to claim 1, wherein the measurement result indicating detection of the presence or absence of the primary signal is obtained either through measurement of the station or by receiving a measurement result report of another station.

3. The method according to claim 1, wherein:
the station is a station but not an access point (AP);
the measurement result indicating detection of the presence or absence of the primary signal is obtained through station measurement but not access point (AP) measurement; and
the station, but not the access point (AP), transmits an updated WSM to an access point (AP) configured to transmit a service to the station but not the access point (AP).

4. The method according to claim 1, wherein:
the WSM and an updated WSM further include maximum transmit (Tx) power information allowed in an available channel identified by the available channel identification information; and
the updated WSM is indicated as an available channel by the database information, and represents maximum power information, that is allowed in the channel in which the primary signal for the measurement result was detected, as a specific value.

5. The method according to claim 1, wherein the another station having received an updated WSM is configured to scan channels indicated by available channels in the updated WSM.

6. The method according to claim 5, wherein the another station having received the updated WSM is indicated as an available channel by the database information in the updated WSM, and is configured to scan even a specific channel in which the primary signal for the measurement result was detected.

7. The method according to claim 1, further comprising:
receiving an enablement signal from a specific access point (AP); and
transmitting a dynamic station enablement (DSE) request message to the specific access point (AP),
wherein the DSE request message includes information regarding the channel in which the primary signal was measured.

8. The method according to claim 7, wherein the DSE request message, if the primary signal is detected in a channel indicated by the enablement signal, includes a reason result code having a predetermined code value indicating that the primary signal was detected in the channel indicated by the enablement signal, so that the reason result code is transmitted to the specific access point (AP).

9. The method according to claim 8, further comprising:
receiving a message indicating switching to another channel through an extended channel switching announcement frame from the specific access point (AP); and
performing channel switching to a channel indicated by the extended channel switching announcement frame.

10. The method according to claim 1, further comprising:
receiving an enablement signal from a specific access point (AP); and
transmitting a dynamic station enablement (DSE) request message to the specific access point (AP),
wherein the DSE request message includes information regarding the channel in which the primary signal was measured,
wherein the DSE request message, if the primary signal is detected in a channel indicated by the enablement signal, includes a reason result code having a predetermined code value indicating that the primary signal was detected in the channel indicated by the enablement signal, so that the reason result code is transmitted to the specific access point (AP),
wherein the WSM and an updated WSM further include maximum transmit (Tx) power information allowed in an available channel identified by the available channel identification information, and
wherein the updated WSM is indicated as an available channel by the database information, and represents maximum power information, that is allowed in the channel in which the primary signal for the measurement result was detected, as a specific value.

11. The method according to claim 10, further comprising:
receiving a message indicating switching to another channel through an extended channel switching announcement frame from the specific access point (AP); and
performing channel switching to a channel indicated by the extended channel switching announcement frame.

12. A station (STA) for operating as an unlicensed device with permission to operate in an available channel that is not used by a licensed device operating in the white space band, the station (STA) comprising:
a transceiver configured to receive a white space map (WSM) including one or more identification information of available channels from a device having database information; and
a processor functionally connected to the transceiver, the processor being configured to:
obtain a measurement result indicating detection of the presence or absence of the primary signal in a specific channel;
changing channel availability of the specific channel which is indicated as available in the WSM, including setting a Type field value to a specific value indicating that channel availability in the WSM is identified from database or the measurement result, when the measurement result indicates that primary signal is measured on the specific channel, by the device having database information; and
control the transceiver to transmit the WSM to another station,
wherein an updated WSM includes specific information indicating:
whether each available channel belonging to the updated WSM is indicated as an available channel by both the database information and the measurement result,
whether each available channel is indicated as an available channel by the database information but the primary signal for the measurement result is detected, and
whether each available channel is not indicated as an available channel by the database information and the primary signal for the measurement result is not detected.

13. The station (STA) according to claim 12, wherein the transceiver is further configured to:
receive an enablement signal from a specific access point (AP); and
transmit a dynamic station enablement (DSE) request message to the specific access point (AP),
wherein the DSE request message includes information regarding the channel in which the primary signal was measured,
wherein the DSE request message, if the primary signal is detected in a channel indicated by the enablement signal, includes a reason result code having a predetermined code value indicating that the primary signal was detected in the channel indicated by the enablement signal, so that the reason result code is transmitted to the specific access point (AP),
wherein the WSM and an updated WSM further include maximum transmit (Tx) power information allowed in an available channel identified by the available channel identification information, and
wherein the updated WSM is indicated as an available channel by the database information, and represents maximum power information, that is allowed in the channel in which the primary signal for the measurement result was detected, as a specific value.

14. The STA according to claim 13, wherein:
the transceiver is further configured to receive a message indicating switching to another channel through an extended channel switching announcement frame from the specific access point (AP); and
the processor is further configured to perform channel switching to a channel indicated by the extended channel switching announcement frame.

* * * * *